United States Patent
Sugimoto et al.

(10) Patent No.: US 10,477,002 B2
(45) Date of Patent: *Nov. 12, 2019

(54) COMMUNICATION SERVER AND COMMUNICATION TERMINAL

(71) Applicant: LINE Corporation, Shinjuku-ku (JP)

(72) Inventors: Kenichi Sugimoto, Tokyo (JP); Shinobu Senoo, Tokyo (JP); Do-hyung Kwon, Sung Nam Si (KR)

(73) Assignee: Line Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/942,857

(22) Filed: Apr. 2, 2018

(65) Prior Publication Data

US 2018/0227404 A1    Aug. 9, 2018

Related U.S. Application Data

(63) Continuation of application No. 14/630,397, filed on Feb. 24, 2015, now Pat. No. 9,967,384.

(30) Foreign Application Priority Data

Feb. 25, 2014    (JP) .................................. 2014-034676

(51) Int. Cl.
*H04M 1/57*    (2006.01)
*H04M 7/00*    (2006.01)
(Continued)

(52) U.S. Cl.
CPC ....... *H04M 1/575* (2013.01); *H04M 3/42042* (2013.01); *H04M 7/006* (2013.01); *H04L 61/106* (2013.01); *H04M 1/2535* (2013.01)

(58) Field of Classification Search
CPC .......................... H04M 1/575; H04M 161/106
See application file for complete search history.

(56) References Cited

U.S. PATENT DOCUMENTS 5,550,905 A * 8/1996 Silverman ............... H04M 1/57
                                                        379/142.07
6,185,616 B1   2/2001 Namma et al.
(Continued)

FOREIGN PATENT DOCUMENTS

JP    2001-119483 A    4/2001
JP    2003-283575 A    10/2003
(Continued)

OTHER PUBLICATIONS

Japanese Office Action, dated Apr. 26, 2016 for corresponding Japanese Patent Application No. 2014-034676. With partial English translation.

(Continued)

*Primary Examiner* — Rina C Pancholi
(74) *Attorney, Agent, or Firm* — Harness, Dickey & Pierce, P.L.C.

(57) ABSTRACT

A communication server includes a receiving unit receiving a conversation request signal including a phone number of a receiving terminal in a PSTN (public switched telephone network) via an IP network; a specifying unit specifying transmitting user information on a user using a transmission terminal transmitting the request signal, and assigning an address on the IP network to the transmission terminal; a first transmission unit transmitting the address and the request signal to a communication carrier having a gateway between the PSTN and the IP network; and a second transmission unit transmitting the phone number and the transmitting user information to a transfer server transferring information to a designated terminal.

20 Claims, 14 Drawing Sheets

(51) Int. Cl.
*H04M 3/42* (2006.01)
*H04L 29/12* (2006.01)
*H04M 1/253* (2006.01)

(56) References Cited

U.S. PATENT DOCUMENTS

| | | | |
|---|---|---|---|
| 6,229,883 B1* | 5/2001 | Kakizaki | H04M 1/57 379/142.04 |
| 6,353,660 B1 | 3/2002 | Burger et al. | |
| 6,628,775 B1 | 9/2003 | Van Tol | |
| 8,611,873 B2 | 12/2013 | Onyon et al. | |
| 9,294,514 B2 | 3/2016 | Guedalia et al. | |
| 2001/0028709 A1 | 10/2001 | Makela et al. | |
| 2003/0002637 A1 | 1/2003 | Miyauchi et al. | |
| 2006/0155978 A1 | 7/2006 | David et al. | |
| 2007/0064918 A1* | 3/2007 | Son | H04L 29/06027 379/355.01 |
| 2007/0147343 A1 | 6/2007 | Sasaki et al. | |
| 2009/0028130 A1 | 1/2009 | Volkaerts et al. | |
| 2009/0042539 A1 | 2/2009 | Jiang et al. | |
| 2011/0040833 A1* | 2/2011 | Curescu | H04M 3/42042 709/203 |
| 2011/0188492 A1 | 8/2011 | Stoops | |
| 2011/0274257 A1 | 11/2011 | Vaananen | |
| 2012/0214456 A1 | 8/2012 | Cho et al. | |
| 2013/0044648 A1 | 2/2013 | Kim et al. | |
| 2013/0051542 A1 | 2/2013 | Yao et al. | |
| 2013/0343234 A1* | 12/2013 | Huang | H04M 3/4211 370/271 |
| 2014/0113604 A1 | 4/2014 | Kim | |
| 2016/0165057 A1 | 6/2016 | Guedalia et al. | |

FOREIGN PATENT DOCUMENTS

| | | |
|---|---|---|
| JP | 2006-033397 A | 2/2006 |
| JP | 2006-352456 A | 12/2006 |
| JP | 2009-147619 A | 7/2009 |
| JP | 2009-272668 A | 11/2009 |
| JP | 2010-016774 A | 1/2010 |
| JP | 2011-114654 A | 6/2011 |
| JP | 2011-151434 A | 8/2011 |
| JP | 2011-259277 A | 12/2011 |
| JP | 2013-519297 A | 5/2013 |
| JP | 2013-531912 A | 8/2013 |
| KR | 10-2011-0110403 A | 10/2011 |

OTHER PUBLICATIONS

Japanese Decision to Grant a Patent dated Sep. 12, 2017, for corresponding Japanese Application No. 2016-195618 with partial English Translation.
Japanese Office Action dated Oct. 16, 2018 for corresponding Japanese Application No. 2017-195151.
Japanese Office Action dated Jun. 4, 2019 for corresponding Japanese Application No. 2017-195151.

* cited by examiner

FIG.2

| USER ID | NICKNAME | NAME | PHONE NUMBER | MAIL ADDRESS | BLOCK SETTING |
|---|---|---|---|---|---|
| PAN2931 | XXX | SATO XX | 090-XXXX-XXXX | pan_xxx@mail.com | — |
| HAN4339 | YYY | SAITO YY | 090-YYYY-YYYY | han_yyy@mail.com<br>han@mail.ne.jp | PAN2931 |
| ICH1392 | ZZZ | SUZUKI ZZ | 090-ZZZZ-ZZZZ<br>045-ZZZZ-ZZZZ | ich_zzz@mail.com | — |
| ... | ... | ... | ... | ... | ... |

501　502　503　504　505　506

COMMUNICATION SERVER AND COMMUNICATION TERMINAL

CROSS-REFERENCE TO RELATED APPLICATIONS

This application is a continuation of U.S. application Ser. No. 14/630,397, filed on Feb. 24, 2015, which is based upon and claims the benefit of priority from the prior Japanese Patent Application No. 2014-034676, filed on Feb. 25, 2014, the entire contents of each of which are incorporated herein by reference.

FIELD

The present invention relates to a technology for connecting communication terminals to each other via a VoIP system and a PSTN.

BACKGROUND

The Internet, which is conventionally used simply as a tool for data transmission, for example, for accessing websites or transmitting electronic mails, is recently applied also for voice communication services, which require a high communication quality for data transmission and a high real-time property. Among such voice communication services, VoIP (Voice over Internet Protocol) systems including IP (Internet Protocol) phone systems using Internet technologies have been put into practice along with the spread of the broadband.

VoIP is a transmission technology for transmitting and receiving voices via an IP network by use of the Internet Protocol (IP). A representative example of VoIP is an IP phone technology. An IP phone service provides voice communication using an IP network of a communication carrier. Communication carriers each have an IP network configured exclusively for the IP phone service in order to keep high quality of the IP phone service. As described in, for example, Japanese Laid-Open Patent Publication No. 2009-272668, a user of an IP phone is assigned a phone number (e.g., number starting with "050") for the IP phone by a communication carrier of the IP phone service. Such a user can perform voice transmission and receiving with another IP phone as well as with a landline phone using an existing public switched telephone network (PSTN).

However, with such an IP phone service, information on a user who transmitted a conversation request signal (such a user will be referred to as a "transmitting user") may not be notified correctly to a user on the receiving side (such a user will be referred to as a "receiving user") depending on the standards of the communication carriers or the specifications of the IP phone terminal which transmits or receives the signal. In such a case, even when a communication terminal of the receiving user (receiving terminal) is called in response to the request signal, the transmitting user information on a terminal of the transmitting user (transmission terminal) is not notified to the receiving terminal. As a result, the receiving terminal cannot make a conversation with the transmission terminal; or the receiving user, when not being aware of the call, does not learn who transmitted the conversation request.

SUMMARY

A communication server in an embodiment according to the present invention includes a receiving unit receiving a conversation request signal including a phone number of a receiving terminal in a PSTN (public switched telephone network) via an IP network; a specifying unit specifying transmitting user information on a user using a transmission terminal transmitting the request signal, and assigning an address on the IP network to the transmission terminal; a first transmission unit transmitting the address and the request signal to a communication carrier having a gateway between the PSTN and the IP network; and a second transmission unit transmitting the phone number and the transmitting user information to a transfer server transferring information to a designated terminal.

The communication server may further include a determination unit determining whether or not the user using the transmission terminal and a user using the receiving terminal each have an account of a predetermined communication service. When the determination unit determines that the user using the transmission terminal and the user using the receiving terminal each have an account of the predetermined communication service, the second transmission unit may notify the transmitting user information to the receiving terminal via the communication service.

The second transmission unit may notify the transmission terminal of that the second transmission unit transmitted the transmitting user information to the receiving terminal via the communication service.

When the determination unit determines that the user using the receiving terminal does not have an account of the predetermined communication service, the second transmission unit may transmit the phone number and the transmitting user information to the transfer server.

When the determination unit determines that the user using the transmission terminal and the user using the receiving terminal each have an account of the predetermined communication service and that the receiving terminal rejects an incoming call or communication from the transmission terminal, the second transmission unit may transmit the phone number and the transmitting user information to the transfer server.

The transfer server may be an SMS (Short Message Service) server.

The second transmission unit may transmit the phone number and the transmitting user information to the transfer server after a call made in accordance with the request signal.

The communication server may further include a delay unit transmitting the address and the request signal to the communication carrier via the first transmission unit a predetermined time duration after the phone number and the transmitting user information are transmitted to the transfer server, and notifying the transmitting user information to the receiving terminal before a call made in accordance with the request signal.

A communication terminal in another embodiment according to the present invention includes a control unit transmitting a conversation request signal including a phone number of a receiving terminal in a PSTN (public switched telephone network) and also transmitting transmission terminal inherent information usable to specify transmitting user information on a transmission terminal transmitting the request signal and usable to assign an address on an IP network to the transmission terminal, the transmission being performed via the IP network. The request signal is transmitted to the receiving terminal via a communication carrier having a gateway between the PSTN and the IP network; the communication carrier receives the address on the IP network and the request signal; and the transmitting user information is transmitted to the receiving terminal via the IP network with the phone number being an addressee.

A communication terminal in still another embodiment according to the present invention includes a control unit receiving a conversation request signal including a phone number of a receiving terminal in a PSTN (public switched telephone network) from a communication server via the PSTN and also receiving transmitting user information on a transmission terminal transmitting the request signal from a transfer server via an IP network; and a display displaying the transmitting user information received by the control unit. The request signal is transmitted from the communication server via a communication carrier having a gateway between the PSTN and the IP network; the communication carrier receives an address on the IP network assigned to the transmission terminal and the request signal; and the transmitting user information is transmitted from the transfer server via the IP network with the phone number being an addressee.

A method in an embodiment according to the present invention includes receiving a conversation request signal including a phone number of a receiving terminal in a PSTN (public switched telephone network) via an IP network; specifying transmitting user information on a user using a transmission terminal transmitting the request signal, and assigning an address on the IP network to the transmission terminal; transmitting the address and the request signal to a communication carrier having a gateway between the PSTN and the IP network; and transmitting the phone number and the transmitting user information to a transfer server transferring information to a designated terminal.

BRIEF DESCRIPTION OF DRAWINGS

FIG. 2 shows user information stored in a user information database in the voice communication system in embodiment 1 according to the present invention;

DESCRIPTION OF EMBODIMENTS

Figure 1:
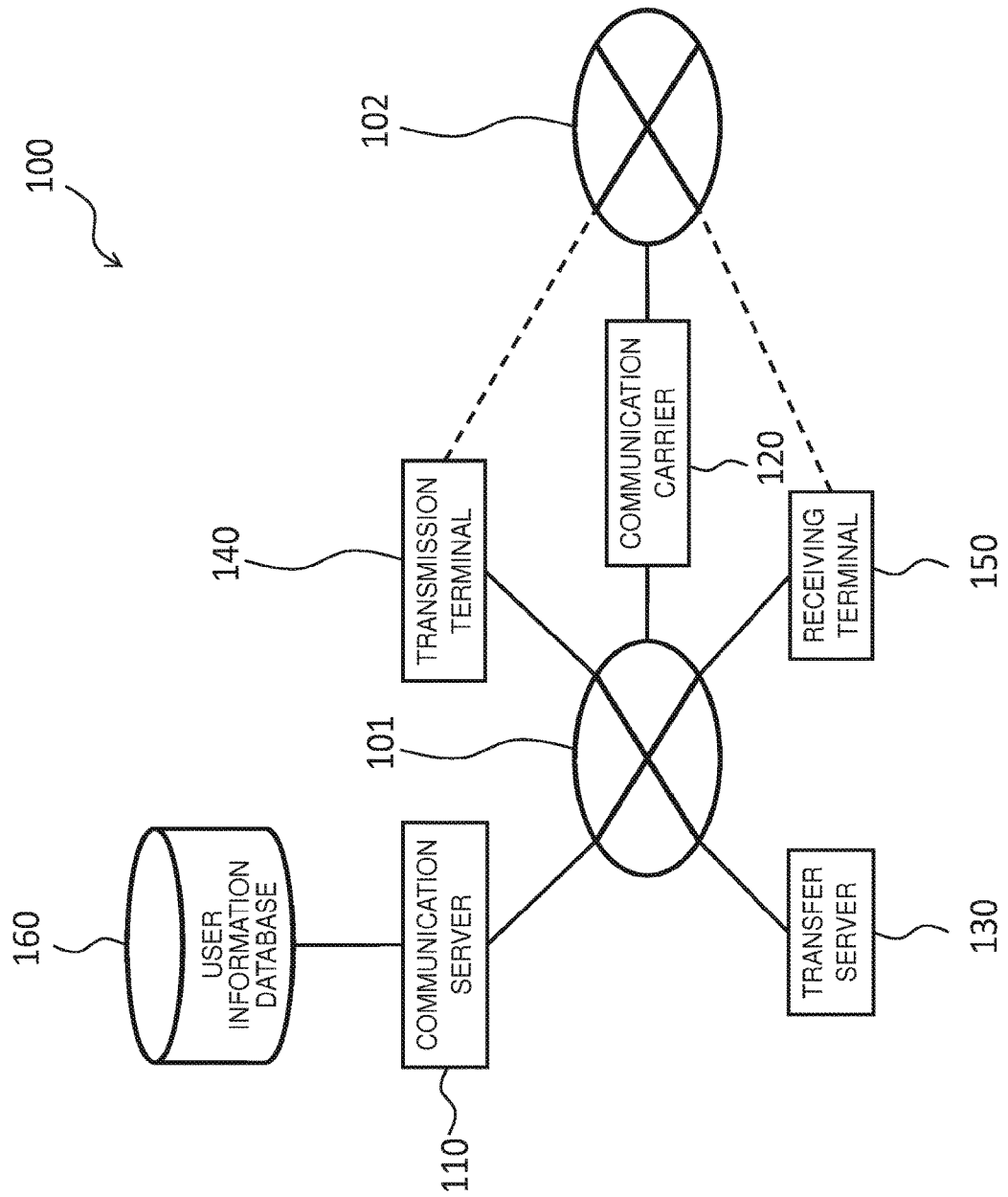
FIG. 1 is a block diagram showing a structure of a voice communication system in embodiment 1 according to the present invention.

Hereinafter, a communication server and a communication terminal according to the present invention will be described with reference to the drawings. It should be noted that the communication server and the communication terminal according to the present invention may be carried out in many different forms, and are not to be interpreted as being limited to the following embodiments. In the drawings referred to in the following embodiments, elements which are the same or which have the same functions will bear identical reference signs, and the descriptions thereof will not be repeated.

Embodiment 1

A voice communication system in embodiment 1 according to the present invention, and a communication server and a communication terminal also in embodiment 1 according to the present invention usable for the voice communication system will be described in detail with reference to the drawings.

<Overview of the System>

FIG. 1 is a block diagram showing a structure of a voice communication system 100 in embodiment 1 according to the present invention. As shown in FIG. 1, the voice communication system 100 includes a communication server 110, a communication carrier 120, a transfer server 130, a transmission terminal 140, and a receiving terminal 150, which are connected to each other via an IP network 101 such as the Internet or the like. The communication carrier 120, the transmission terminal 140 and the receiving terminal 150 are connected to each other via a PSTN 102. The communication server 110 is connected to a user information database 160.

The communication server 110 is used to associate two or more communication applications to each other or terminate the association in order to provide a communication of various types of data including voice data, video data and the like via the IP network 101 (for example, the communication server 100 starts or discontinues such a communication). The communication server 110 may be of, for example, a Session Initiation Protocol (SIP). Specifically, the communication server 110 operates as follows. Upon receipt of a conversation request signal from the transmission terminal 140 via the IP network 101, the communication server 110 transmits the request signal to the receiving terminal 150 via the communication carrier 120 and the PSTN 102, and thus communicably connects the transmission terminal 140 and the receiving terminal 150 to each other via the communication carrier 120. The communication server 110 transmits transmitting user information on the transmission terminal 140 to the receiving terminal 150 via the transfer server 130.

The communication carrier 120 manages facilities such as the IP network 101, the PSTN 102 and the like, and provides a voice communication service. Specifically, the communication carrier 120 owns a gateway between the IP network 101 and the PSTN 102. The gateway allows the transmission terminal 140 and the receiving terminal 150 to be communicably connected to each other via the IP network 101 and the PSTN 102. In the example shown in FIG. 1, the IP network 101 and the PSTN 102 are commonly managed by one communication carrier 120. The voice communication system 100 is not limited to having such a system, and the IP network 101 and the PSTN 102 may be managed by different communication carriers.

The transfer server 130 transfers information to a designated terminal. Specifically, the transfer server 130 is a server that transfers the transmitting user information on the transmission terminal 140 received from the communication server 110 to the receiving terminal 150 in the form of a message by use of a communication measure represented by a short message service (SMS). The transfer server 130 may be separate from the communication server 110 as shown in FIG. 1, or the communication server 110 may have a function of the transfer server 130.

The transmission terminal 140 and the receiving terminal 150 are both communication terminals having substantially the same functions. Herein, for the convenience of explanation of the voice communication system, the terminal of a transmitting user who transmits a conversation request signal will be referred to as the "transmission terminal 140", and the terminal of a receiving user who receives the request signal will be referred to as the "receiving terminal 150". The transmission terminal 140 merely needs to be connectable with at least the IP network 101 like, for example, a tablet PC, and may not need to be connectable with the PSTN 102.

<User Information Stored in the Database>

The user information database 160 stores various types of user information that specify the transmission terminal 140, the receiving terminal 150 and the like. Now, with reference to FIG. 2, specific examples of user information stored in the user information database 160 will be described. FIG. 2 shows user information stored in the user information database 160 in the voice communication system 100 in embodiment 1 according to the present invention.

The user information database 160 includes a user information list as shown in FIG. 2. The user information list includes user-specifying information on the transmission terminal 140 registered in a communication service (SNS) related to the communication server 110, for example, a user ID 501, a nickname 502, a name 503, a phone number 504, a mail address 505, a block setting 506 and the like. The user ID 501 is an inherent ID that is unique to an individual communication device registered in the user information database in advance and is used to identify the individual communication device. The above-described pieces of user-specifying information on an individual user are associated to one another. The inherent ID is a unique serial number assigned to an individual communication device.

The nickname 502 is a name in the SNS registered by the user, and the user can register any nickname. The block setting 506 is used in the case where the user using the receiving terminal 150 and the user using the transmission terminal 140 both have an account of the SNS. When the receiving terminal 150 intends to reject an incoming call or communication from the transmission terminal 140, the transmission terminal 140 is registered in the block setting 506. For example, in the case where, as shown in FIG. 2, the user "HAN4339" registers "PAN2931" in the block setting 506, the user "HAN4339" rejects an incoming call or communication from the user "PAN2931".

<Hardware Structure of the Communication Server>

Figure 3:
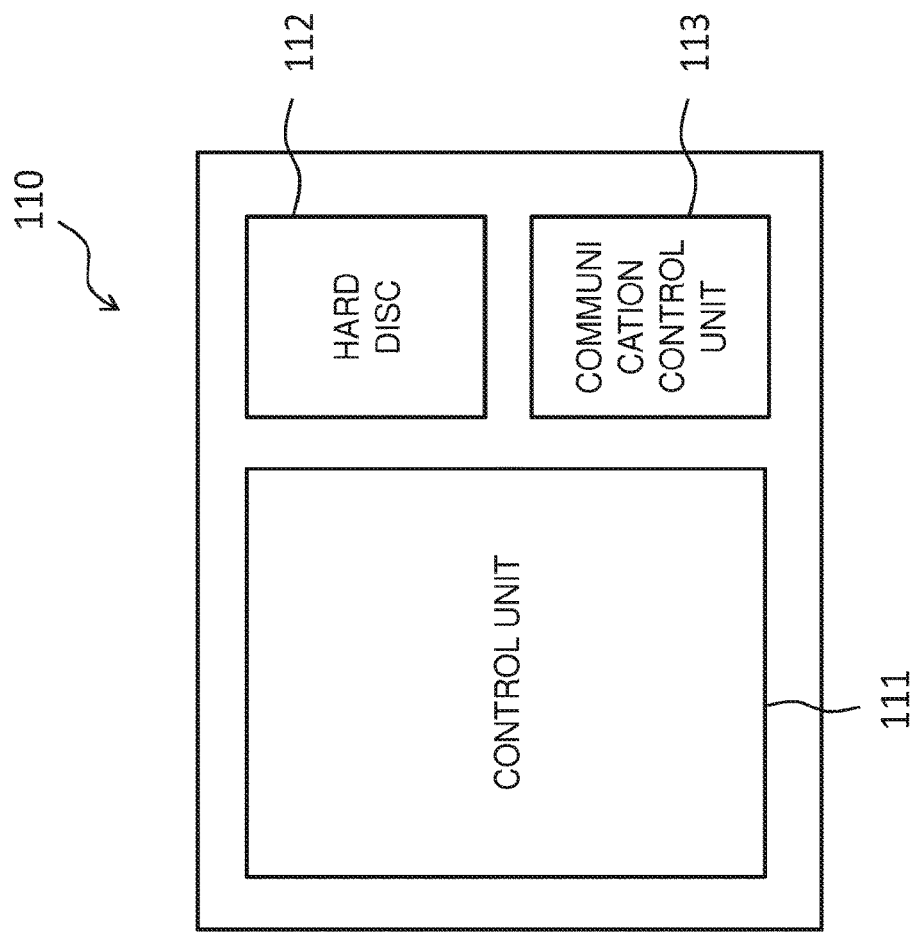
FIG. 3 is a schematic view showing a hardware structure of a communication server usable for the voice communication system in embodiment 1 according to the present invention.

FIG. 3 is a schematic view showing a hardware structure of the communication server 110 usable in the voice communication system 100 in embodiment 1 according to the present invention. As shown in FIG. 3, the communication server 110 includes a control unit 111, a hard disc 112, and a communication control unit 113. The control unit 111 includes a central processing unit (CPU), a register and a storage device such as a memory or the like. The control unit 111 executes a program stored on the memory by use of the CPU to perform a computation process in accordance with a command signal from the transmission terminal 140, the receiving terminal 150 or the like. The hard disc 112 is a memory capable of storing a large capacity of data, and stores, for example, programs necessary for computation processes. The storage device in the control unit 111 reads a program necessary for a computation process from the hard disc 112 when necessary. The communication control unit 113 connects the communication server 110 and the IP network 101 to each other and controls data input and output.

<Hardware Structure of the Communication Terminal>

Figure 4:
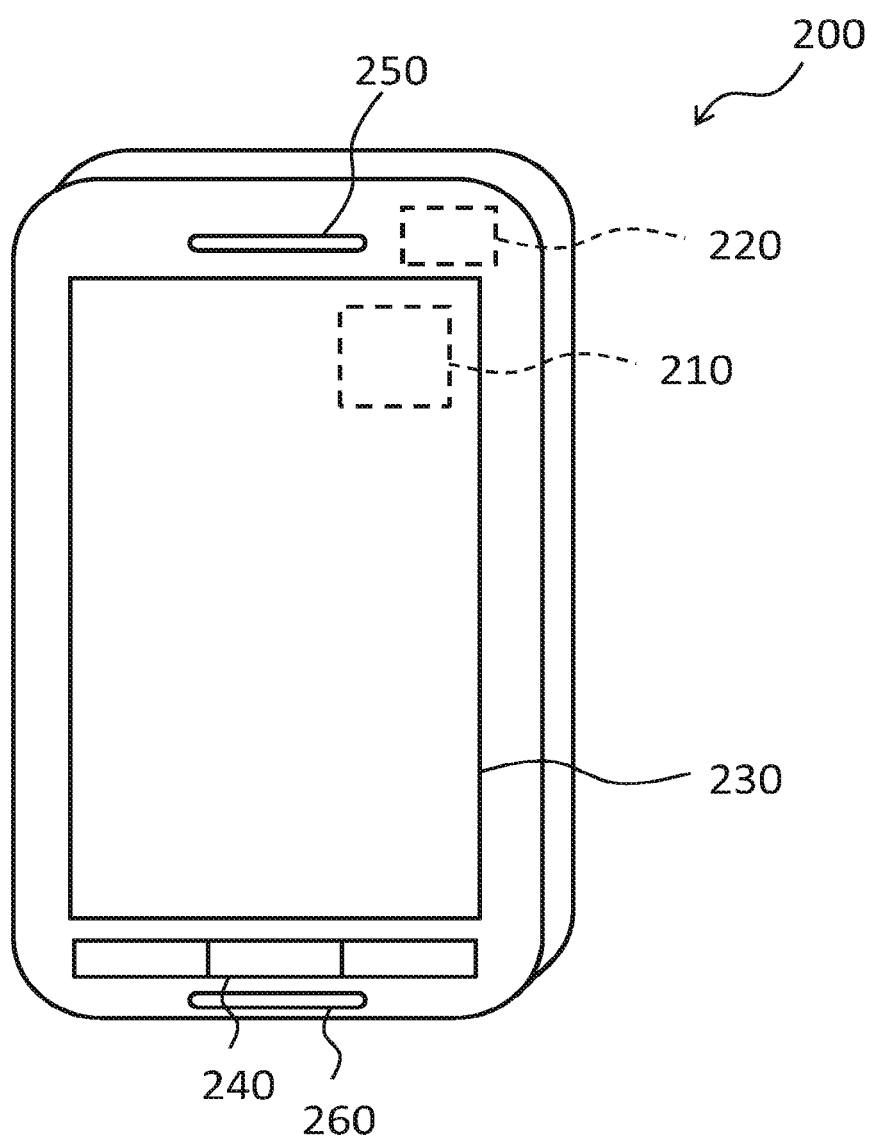
FIG. 4 is a schematic view showing a hardware structure of a communication terminal usable for the voice communication system in embodiment 1 according to the present invention.

FIG. 4 is a schematic view showing a hardware structure of a communication terminal usable for the voice communication system 100 in embodiment 1 according to the present invention. As shown in FIG. 4, a communication terminal 200 includes a control unit 210 and a communication module 220 provided inside a main body thereof. The communication terminal 200 also includes a display 230, an operation button 240, a speaker 250 and a microphone 260 provided on one surface of the main body thereof. The display 230 may include a touch sensor, and the operation button 240 may not need to be provided.

The control unit 210 includes a CPU, a register and a storage device such as a memory or the like. The control unit 210 executes a program stored on the memory by use of the CPU to realize any of various functions of the communication terminal 200 in accordance with a command signal input by the user. The communication module 220 includes an antenna that transmits or receives a signal wirelessly, a high frequency circuit, a demodulation circuit and the like. The communication module 220 is controlled by the control unit 210 to be connected to a network and thus access the communication server 110.

The display 230 may be a liquid crystal display, an organic EL display or the like. The touch sensor may be of a resistance film type, an electrostatic capacitance type, an optical type or the like. The user follows an instruction shown on the display 230 to operate the communication terminal 200 and thus realizes any of the various functions.

Now, the control unit 210 in the case where the communication terminal 200 is used as the transmission terminal 140 will be described in detail. The control unit 210 controls the communication module 220 to transmit, via the IP network 101, a conversation request signal including a phone number of the receiving terminal 150 in the PSTN 102 and an inherent ID (inherent information on the transmission terminal) used to specify the transmitting user information on the transmission terminal 140 which transmitted the request signal and also used to assign an address on the IP network 101 to the transmission terminal 140. The request signal is transmitted to the receiving terminal 150 via the communication carrier 120 having the gateway between the PSTN 102 and the IP network 101. The communication carrier 120 receives the address on the IP network 101 and the request signal. The transmitting user information is transmitted to the receiving terminal 150 via the IP network 101 with the phone number of the receiving terminal 150 being the addressee.

Now, the control unit 210 in the case where the communication terminal 200 is used as the receiving terminal 150 will be described in detail. The control unit 210 controls the communication module 220 to receive a conversation request signal including the phone number of the receiving terminal 150 in the PSTN 102 from the communication server 110 via the PSTN 102 and also to receive the transmitting user information on the transmission terminal 140 which transmitted the request signal from the transfer server 130 via the IP network 101. The request signal is transmitted from the communication server 110 via the communication carrier 120 having the gateway between the PSTN 102 and the IP network 101. The communication carrier 120 receives the address on the IP network 101 assigned to the transmission terminal 140 and the request signal. The transmitting user information is transmitted from the transfer server 130 via the IP network 101 with the phone number of the receiving terminal 150 being the addressee. The transmitting user information received by the control unit 210 is displayed by the display 230.

<Functional Structure of the Communication Server>

Figure 5:
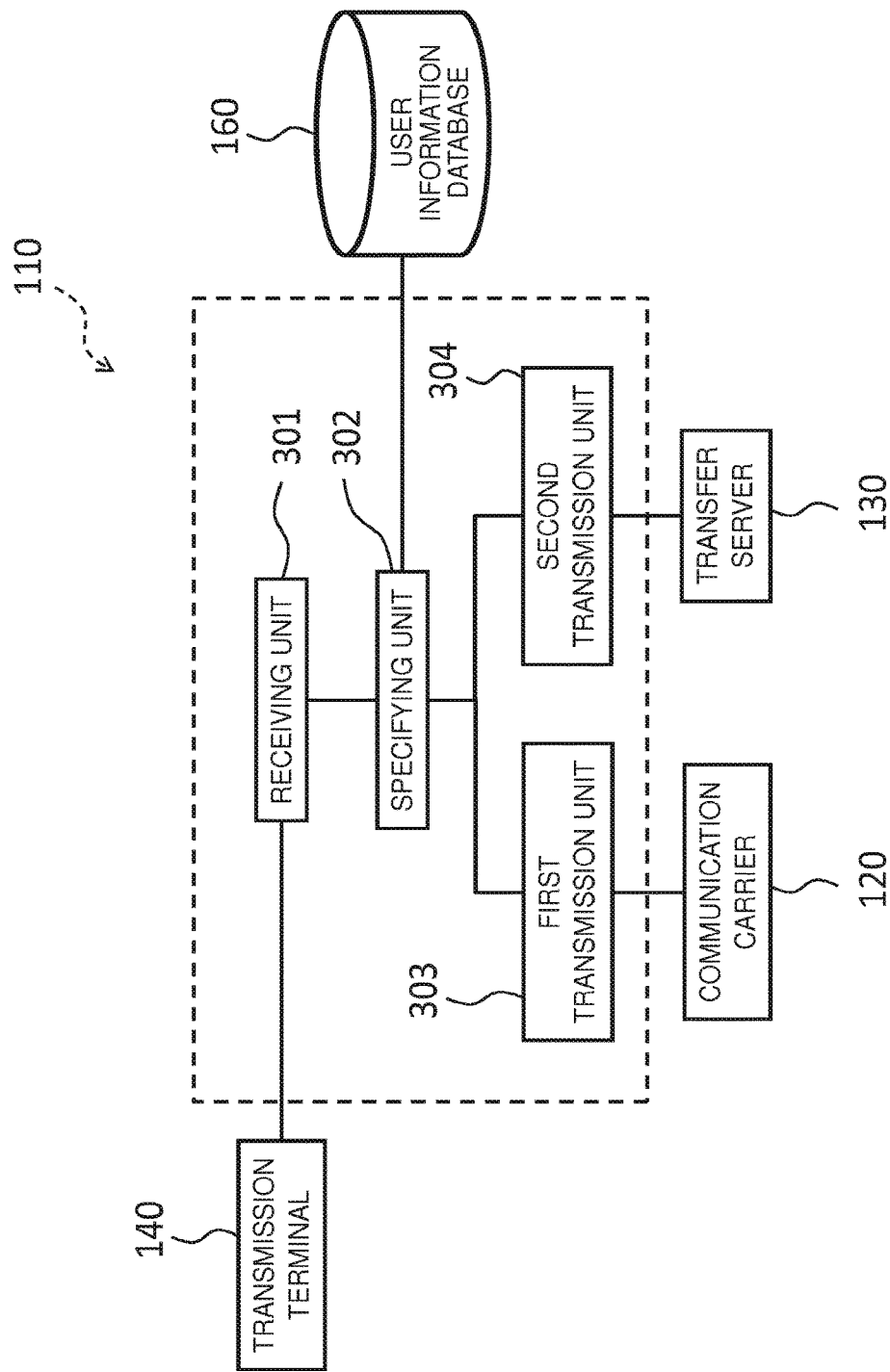
FIG. 5 is a block diagram showing a functional structure of the communication server in the voice communication system in embodiment 1 according to the present invention.

FIG. 5 is a block diagram showing a functional structure of the communication server 110 in the voice communication system 100 in embodiment 1 according to the present invention. With reference to FIG. 5, each of functions of the communication server 110 shown in FIG. 1 will be described in more detail. As shown in FIG. 5, the communication server 110 includes a receiving unit 301, a specifying unit 302, a first transmission unit 303 and a second transmission unit 304.

The receiving unit 301 receives a conversation request signal including the phone number of the receiving terminal 150 from the transmission terminal 140 via the IP network 101.

The specifying unit 302 specifies the transmitting user information on the transmission terminal 140 which transmitted the request signal. Specifically, the specifying unit 302 searches the user information database 160 for, for example, the inherent ID of the transmission terminal 140. When the inherent ID is detected and a user ID matching the inherent ID or a user ID associated with the inherent ID is detected in the user information database 160, the specifying unit 302 specifies the pieces of information on the user as shown in FIG. 2, for example, the name associated with the user ID, the registered nickname, the phone number, the mail address or the like.

In the case where, for example, the inherent ID of the transmission terminal 140 is "PAN2931", the specifying unit 302 makes a search in the user information database 160 by use of "PAN2931" as a keyword. When a user ID matching "PAN2931" is detected in the user information database 160, the specifying unit 302 specifies at least one of the nickname "XXX", the name "Sato XX", the phone number "090-XXXX-XXXX" and the mail address "pan_xxx@mail.com" as transmitting user information on the transmission terminal 140.

The specifying unit 302 assigns an IP address on the IP network 101 to the transmission terminal 140 which transmitted the request signal. In embodiment 1, the specifying unit 302 assigns a dynamic IP address, for example.

The first transmission unit 303 transmits the request signal transmitted from the transmission terminal 140 and the IP address assigned by the specifying unit 302 to the communication carrier 120. The second transmission unit 304 transmits information specifying the receiving terminal 150 and the transmitting user information specified by the specifying unit 302 to the transfer server 130. Specifically, as the information specifying the receiving terminal 150, the phone number of the receiving terminal 150 is transmitted to the transfer server 130.

The second transmission unit 304 transmits the transmitting user information to the transfer server 130 in the form of a message. Specifically, the transfer server 130 is an SMS server, and the second transmission unit 304 transmits the transmitting user information to the SMS server in the form of a message with the phone number of the receiving terminal 150 as the addressee. In this embodiment of the present invention, the transfer server 130, which is separate from the communication server 110, transfers the transmitting user information to the receiving terminal 150. The voice communication system 100 is not limited to having such a structure. For example, the communication server 110 may have a function of transmitting the transmitting user information to the receiving terminal 150.

<Operation Flow of the Voice Communication System>

Figure 6:
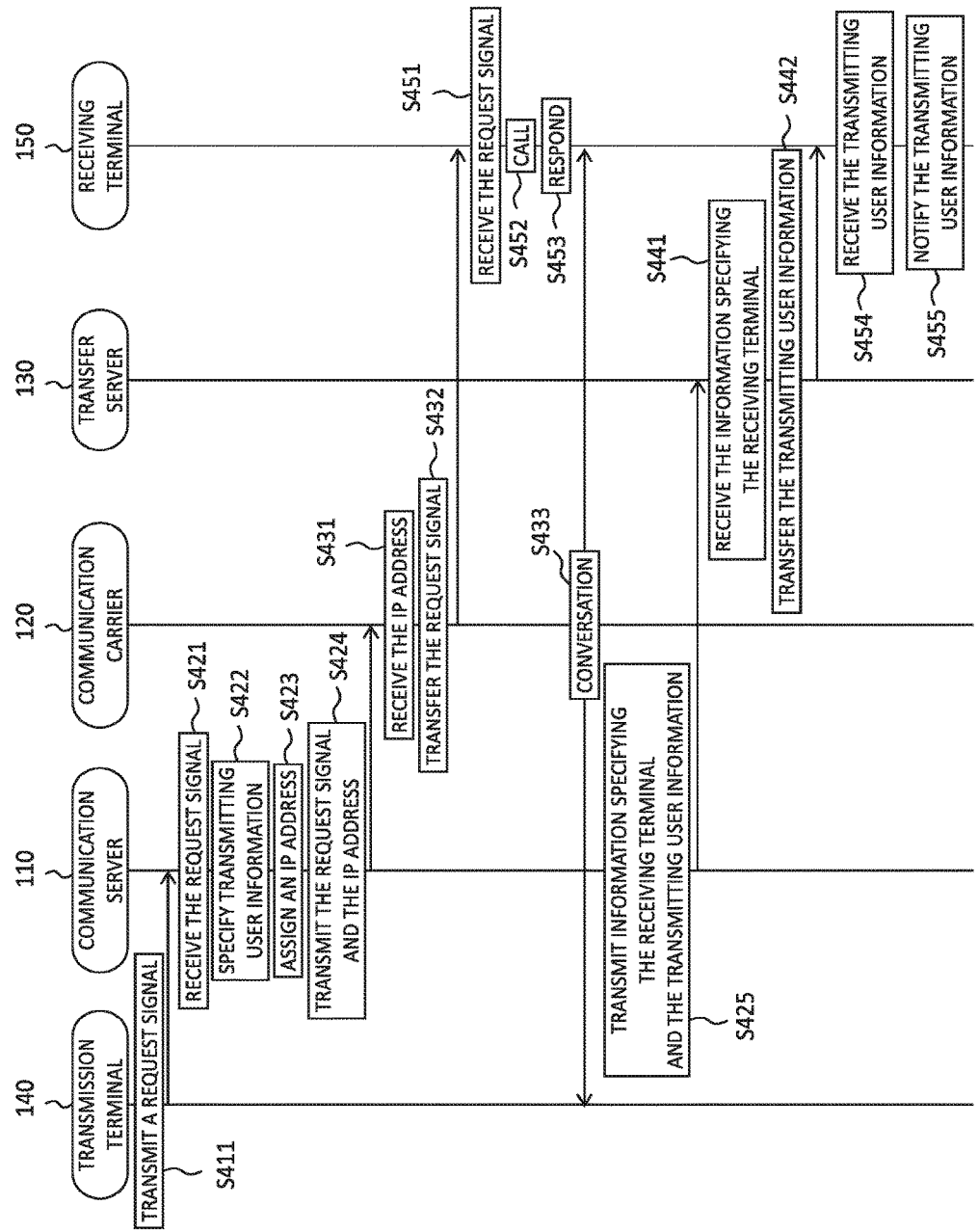
FIG. 6 shows an operation flow of the voice communication system in embodiment 1 according to the present invention.

FIG. 6 shows an operation flow of the voice communication system 100 in embodiment 1 according to the present invention. With reference to FIG. 6, the operation of each of blocks of the voice communication system 100 shown in FIG. 1 will be described in detail.

First, the transmitting user inputs the phone number of the receiving terminal 150 to the transmission terminal 140 to make a transmission. This operation causes the transmission terminal 140 to transmit a request signal to the communication server 110 (step S411).

The communication server 110 receives the request signal transmitted in step S411 (step S421). Next, the communication server 110 specifies the transmitting user information on the transmission terminal 140 which transmitted the request signal based on the inherent ID of the transmission terminal 140 (step S422). The "transmitting user information on the transmission terminal 140" is the name, the registered nickname, the phone number, the mail address or the like of the user of the transmission terminal 140 in an SNS related to the communication server 110. The "SNS related to the communication server 110" may be an SNS managed by the communication server 110 or an SNS managed by an SNS server cooperating with the communication server 110.

The communication server 110 assigns an IP address on the IP network 101 to the transmission terminal 140 based on the inherent ID of the transmission terminal 140 (step S423). Next, the communication server 110 transmits the request signal received in step S421 and the IP address assigned in step S423 to the communication carrier 120 (step S424).

The communication carrier 120 receives the IP address transmitted in step S424 (step S431), and transfers the request signal transmitted in step S424 to the receiving terminal 150 (step 432).

The receiving terminal 150 receives the request signal transferred in step S432 (step S451). Upon receipt of the request signal, the receiving terminal 150 calls the receiving user (step S452). The receiving user, when intending to do the conversation, make an action of accepting the incoming call in response to the call made in step S452, so that the receiving terminal 150 responds to the request signal (step S453). The response made in step S453 causes the transmission terminal 140 and the receiving terminal 150 to be connected to each other via the communication carrier 120, and thus a conversation starts (step S433).

After transmitting the request signal and the IP address in step S424, the communication server 110 transmits the information specifying the receiving terminal 150 and the transmitting user information specified in step S422 to the transfer server 130 (step S425). Specifically, as the information specifying the receiving terminal 150, the phone number of the receiving terminal 150 is transmitted to the transfer server 130. The communication server 110 may notify the transmission terminal 140 of that the communication server 110 transmitted the transmitting user information to the receiving terminal 150 via the transfer server 130.

The transfer server 130 receives the information specifying the receiving terminal 150 transmitted in step S425 (step S441), and transfers the transmitting user information transmitted in step S425 to the receiving terminal 150 based on the information specifying the receiving terminal 150 received in step S441 (step S442). The transfer server 130 transmits the transmitting user information transmitted in step S425 to the receiving terminal 150 in the form of a message as transmitted by, for example, an SMS server.

The receiving terminal 150 receives the transmitting user information transferred in step S442 (step S454). Next, the receiving terminal 150 notifies the received transmitting user information to the receiving user in the form of a message (step S455).

In the operation flow shown in FIG. 6, the transmission of the transmitting user information in step S425 is performed after the conversation in step S433. The present invention is not limited to such a flow. The transmission of the transmitting user information in step S425 may be performed at any time after the transmitting user information is specified in step S422. For example, the transmission of the transmitting user information in step S425 may be performed before the conversation in step S433; or at the same time as, or before, the transmission of the request signal and the IP address in step S424. In the case where the transmission of the transmitting user information in step S425 is performed before the transmission of the request signal and the IP address in step S424, the receiving terminal 150 may perform the notification of the transmitting user information in step S455 before the call in step S452.

<Example of the Notification of the Transmitting User Information by the Receiving Terminal 150>

Figure 7:
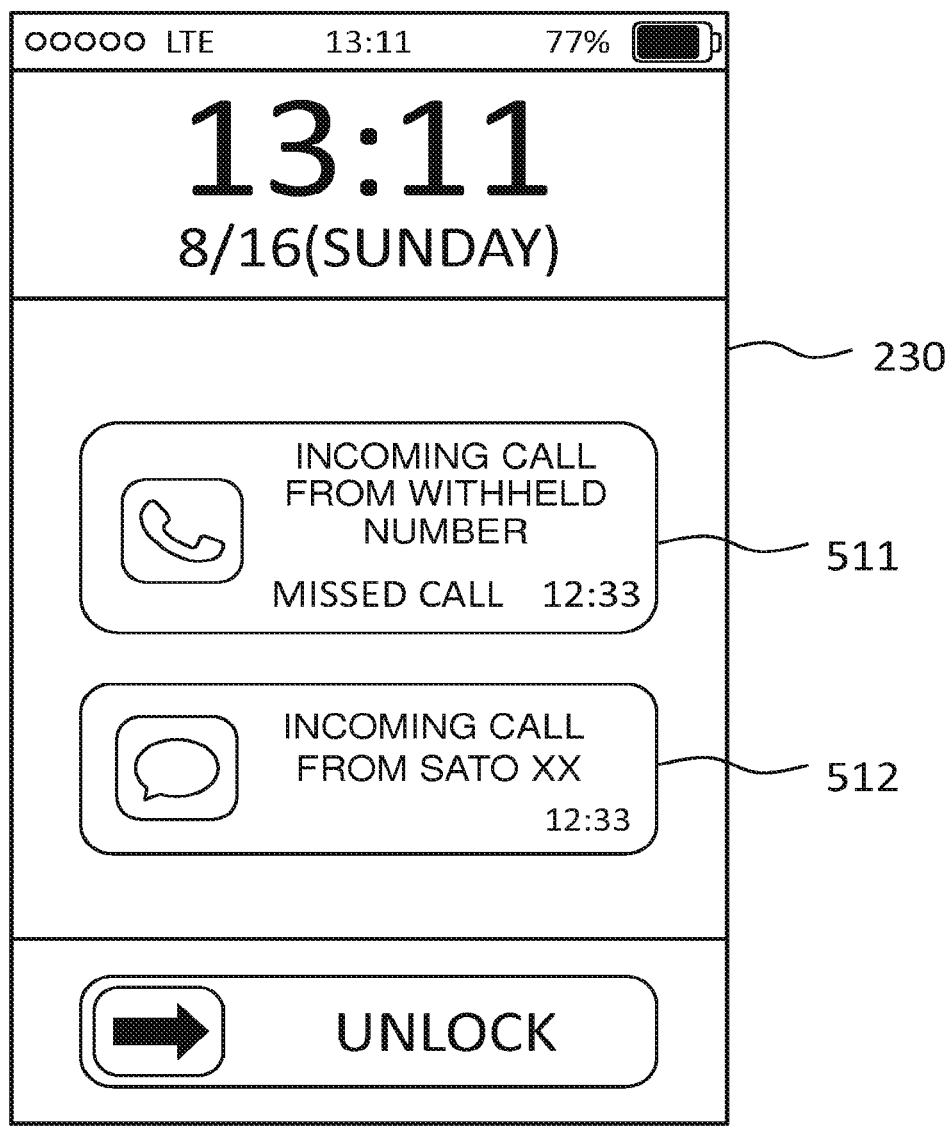
FIG. 7 shows a display screen of a communication terminal usable for the voice communication system in embodiment 1 according to the present invention, the display screen notifying transmitting user information.

With reference to FIG. 7, a specific example of display for the notification of the transmitting user information in step S455 shown in FIG. 6 will be described. FIG. 7 shows a display screen of a communication terminal usable for the voice communication system 100 in embodiment 1 according to the present invention. The display screen shown in FIG. 7 notifies the transmitting user information. The example of display shown in FIG. 7 is provided in the case where the phone number of the transmission terminal 140 was not notified to the receiving terminal 150 via the communication carrier 120, and the receiving user did not respond to the call.

As shown in FIG. 7, the display 230 of the receiving terminal 150 shows a missed-call notice 511 and a transmitting-user-information notice 512. The missed-call notice 511 notifies the name of the user "Sato XX" of the transmission terminal 140 specified in step S422 shown in FIG. 6 and is displayed by the receiving terminal 150 by a process performed in steps S425, S441, S442, S454 and S455.

With a conventional voice communication system, in the case where the phone number of the transmission terminal 140 is not notified to the receiving terminal 150 via the communication carrier 120, only the missed-call notice 511 is displayed and the transmitting user information is not displayed (in general, a message "notification impossible" or the like is displayed by the receiving terminal). By contrast, with the voice communication system 100 according to the present invention, even when the phone number of the transmission terminal 140 is not notified to the receiving terminal 150 via the communication carrier 120, the transmitting user information is notified to the receiving terminal 150 via the transfer server 130.

As described above, with the voice communication system 100 in embodiment 1, even when the transmitting user information on the transmission terminal 140 which transmitted the conversation request signal is not notified to the receiving terminal 150 via the communication carrier 120, the transmitting user information is notified to the receiving terminal 150.

Embodiment 2

A voice communication system in embodiment 2 according to the present invention, and a communication server and a communication terminal also in embodiment 2 according to the present invention usable for the voice communication system will be described in detail with reference to the drawings.

<System Structure>

Figure 8:
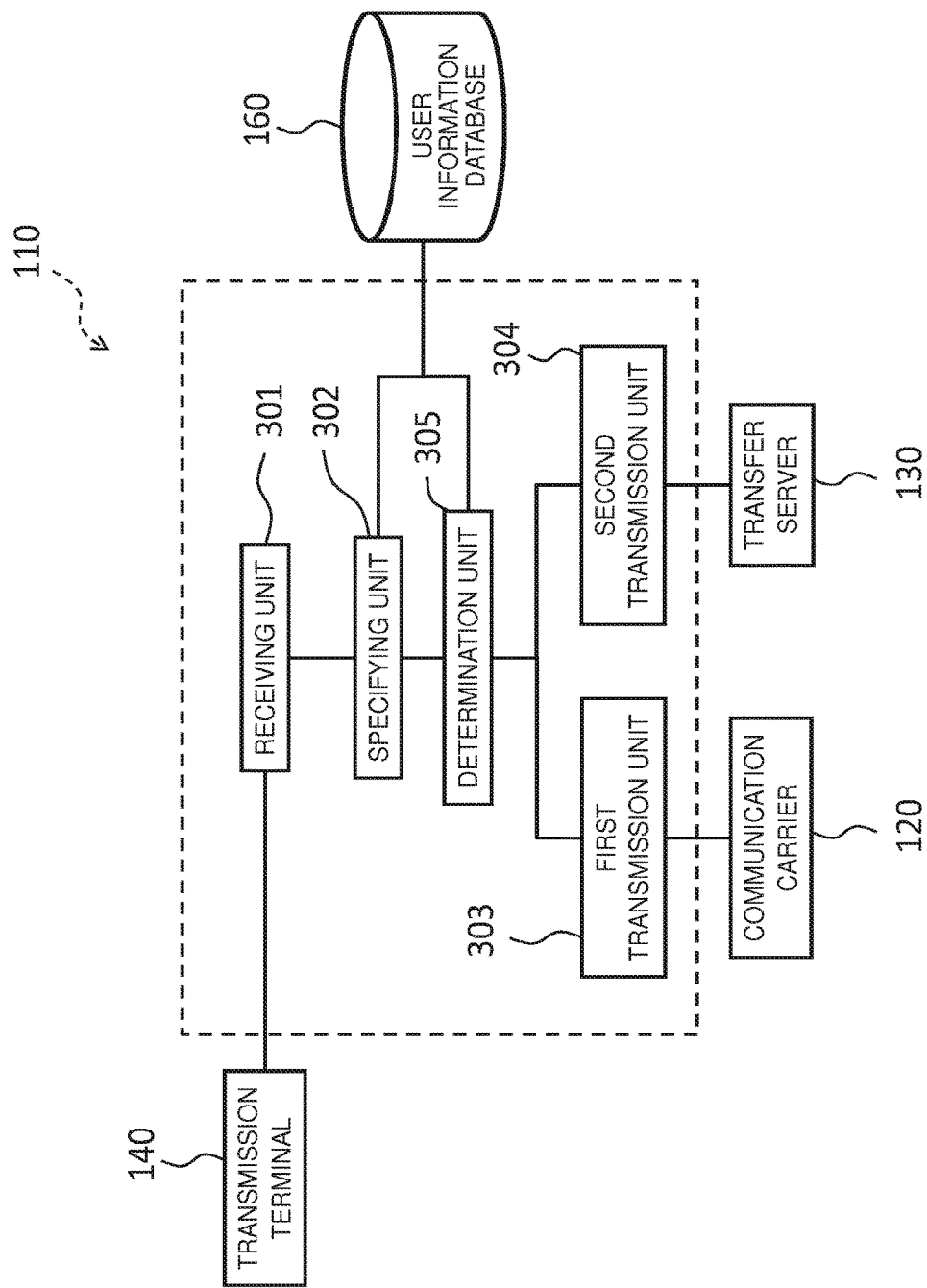
FIG. 8 is a block diagram showing a functional structure of a communication server in a voice communication system in embodiment 2 according to the present invention.

FIG. 8 is a block diagram showing a functional structure of a communication server 110 of a voice communication system in embodiment 2 according to the present invention. FIG. 8 is similar to FIG. 5, but the communication server 110 shown in FIG. 8 includes a determination unit 305 unlike the communication server 110 shown in FIG. 5. The determination unit 305 determines whether or not the transmitting user, who is the user of the transmission terminal 140, and the receiving user, who is the user of the receiving terminal 150, each have an account of an SNS related to the communication server 110.

When the determination unit 305 determines that both of the transmitting user and the receiving user have an account of the SNS related to the communication server 110, the second transmission unit 304 notifies, via the SNS, user-specifying information in the SNS (user ID, name, registered nickname, phone number or mail address) as the transmitting user information to the receiving terminal 150. At this point, the second transmission unit 304 may notify the transmission terminal 140 of that the second transmission unit 304 notified the transmitting user information to the receiving terminal 150 via the SNS. By contrast, when the determination unit 305 determines that the receiving user does not have an account of the SNS, the second transmission unit 304 transmits the phone number of the receiving terminal 150 and the transmitting user information on the transmission terminal 140 to the transfer server 130, like in embodiment 1.

<Operation Flow of the Determination Unit 305>

Figure 9:
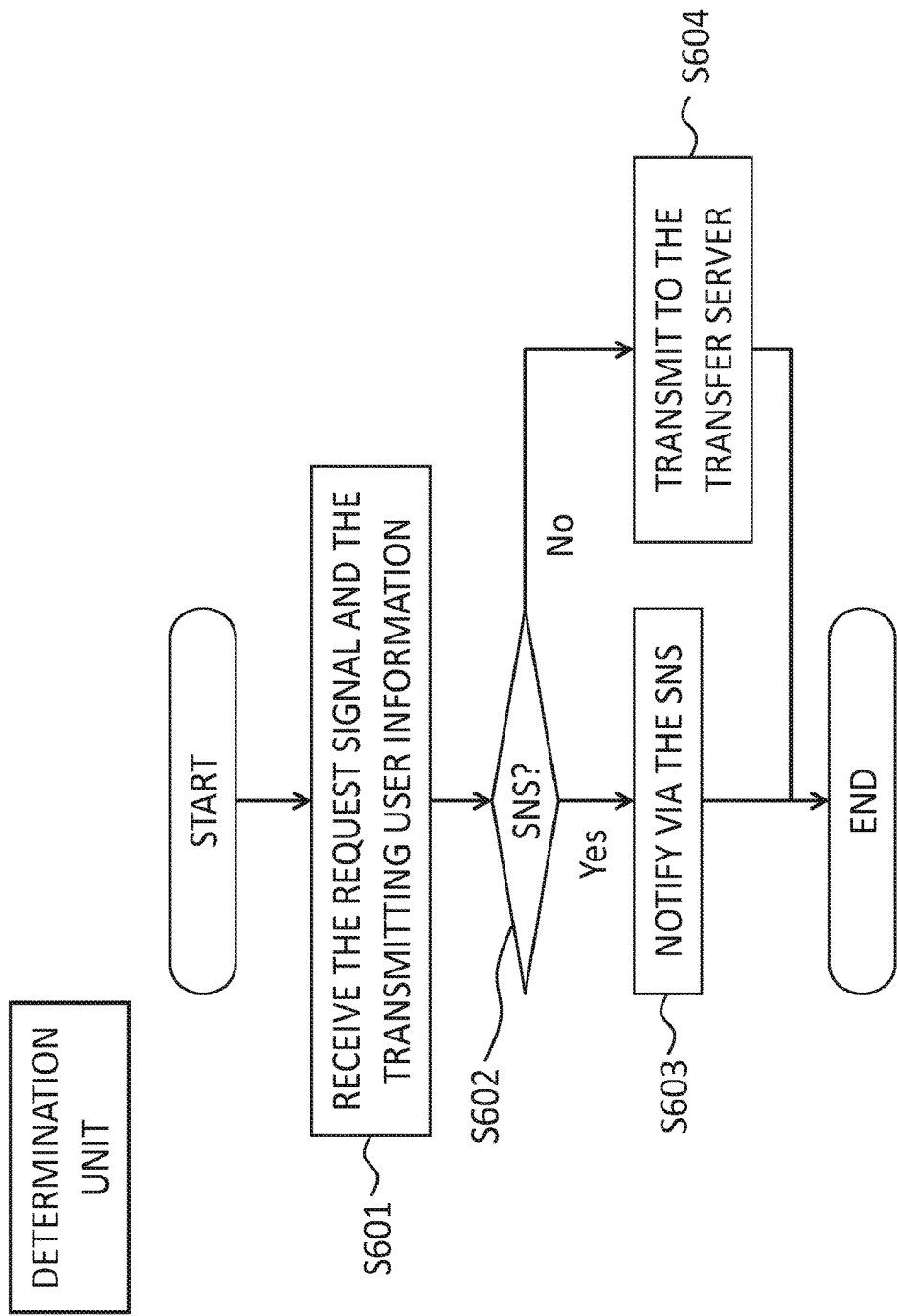
FIG. 9 shows an operation flow of a determination unit in the communication server in the voice communication system in embodiment 2 according to the present invention.

FIG. 9 is a flowchart showing an operation flow of the determination unit 305 in the communication server 110 in the voice communication system in embodiment 2 according to the present invention. The operation of the determination unit 305 starts with receiving the request signal received by the receiving unit 301 and the transmitting user information specified by the specifying unit 302 (step S601). The determination unit 305 determines whether or not the transmitting user and the receiving user each have an account of an SNS related to the communication server 110 based on the request signal and the transmitting user information received in step S601 (step S602). Specifically, the determination unit 305 searches the user information database 160 for the user ID of the transmission terminal 140 specified by the specifying unit 302 and the phone number of the receiving terminal 150 included in the request signal to determine whether or not the transmitting user and the receiving user each have an account of the SNS.

When the determination unit 305 determines in step S602 that the transmitting user and the receiving user each have an account of the SNS, the second transmission unit 304 notifies the transmitting user information to the receiving terminal 150 via the SNS (step 603). Thus, the determination unit 305 terminates operating. By contrast, when the determination unit 305 determines in step S602 that the receiving user does not have an account of the SNS, the second transmission unit 304 transmits the transmitting user information to the transfer server 130 (step 604). Thus, the determination unit 305 terminates operating.

Modification of Embodiment 2

Figure 10:
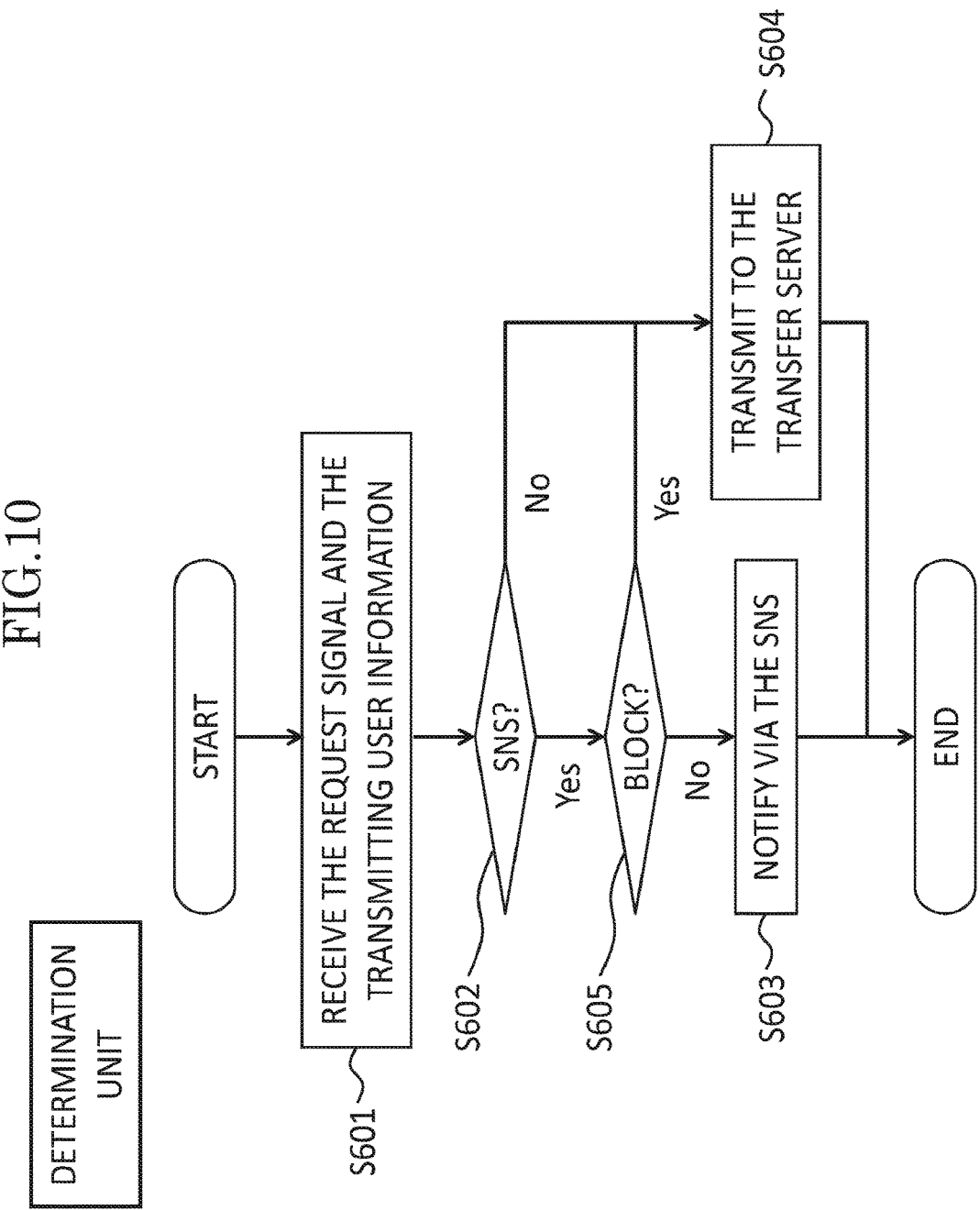
FIG. 10 shows an operation flow of a determination unit in a communication server in a voice communication system in a modification of embodiment 2 according to the present invention.

FIG. 10 is a flowchart showing an operation flow of the determination unit 305 in a communication server 110 in a voice communication system in a modification of embodiment 2 according to the present invention. FIG. 10 is similar to FIG. 9, but is different from FIG. 9 in the following point. In the operation flow shown in FIG. 10, when determining in step S602 that the transmitting user and the receiving user each have an account of an SNS related to the communication server 110, the determination unit 305 determines whether or not the receiving terminal 150 rejects an incoming call or communication from the transmission terminal 140, namely, has set the transmission terminal 140 to be blocked.

As shown in FIG. 10, when determining in step S602 that the transmitting user and the receiving user each have an account of the SNS, the determination unit 305 determines whether or not the receiving terminal 150 has set the transmission terminal 140 to be blocked (step S605). The determination unit 305 makes the determination by referring to the block setting 506 (FIG. 2) of the user information database 160. When the determination unit 305 determines in step 605 that the receiving terminal 150 has not set the transmission terminal 140 to be blocked, the second transmission unit 304 notifies the transmitting user information to the receiving terminal 150 via the SNS (step S603). Thus, the determination unit 305 terminates operating. By contrast, when the determination unit 305 determines in step S605 that the receiving terminal 150 has set the transmission terminal 140 to be blocked, the second transmission unit 304 transmits the transmitting user information to the transfer server 130 (step 604). Thus, the determination unit 305 terminates operating.

<Example of the Notification of the Transmitting User Information by the Receiving Terminal 150>

Figure 11:
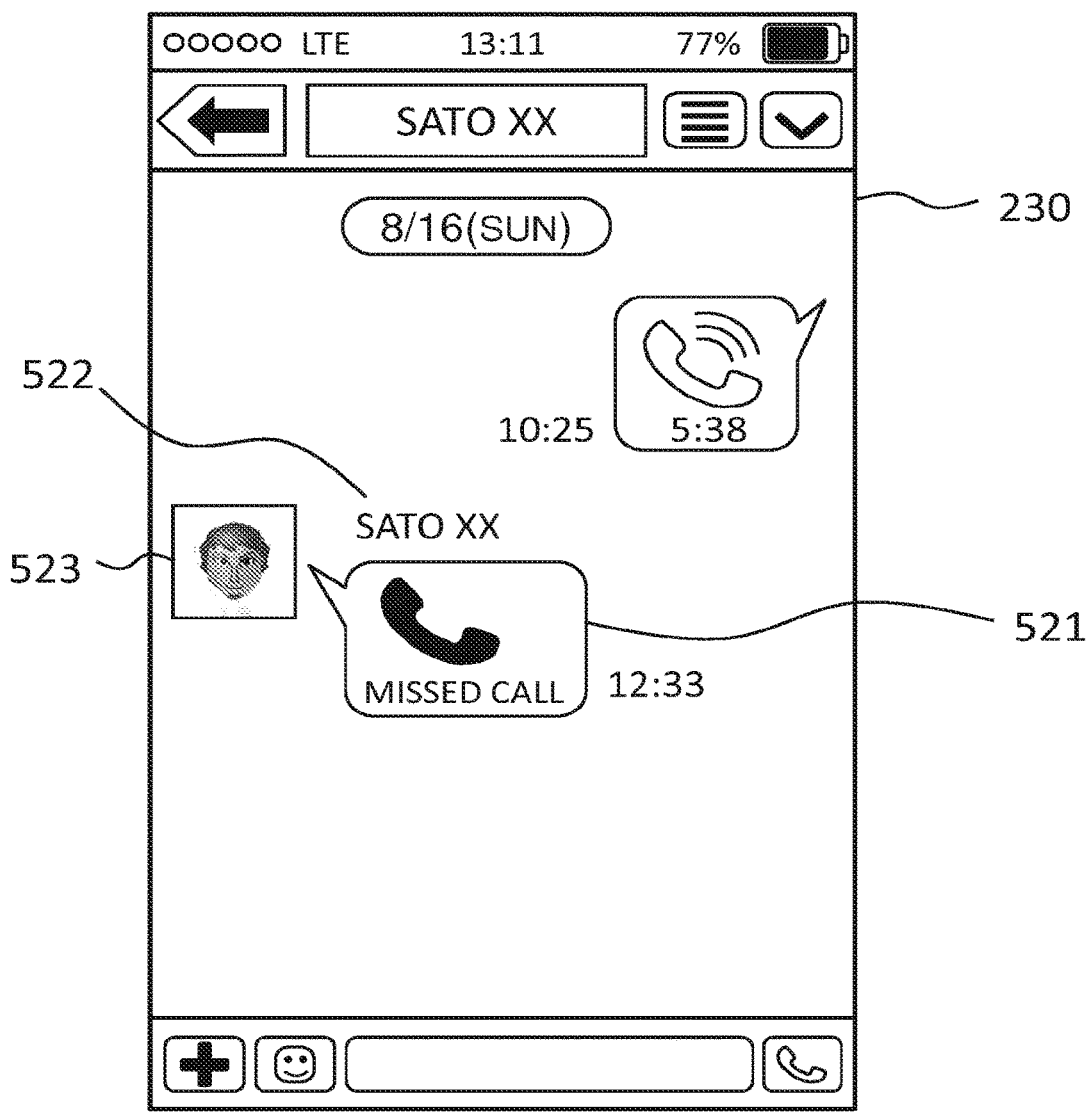
FIG. 11 shows a display screen of a communication terminal usable for the voice communication system in embodiment 2 according to the present invention, the display screen notifying transmitting user information.

Now, with reference to FIG. 11, a specific example of display that is provided when the transmitting user information is notified to the receiving terminal 150 via the SNS in step S603 shown in FIG. 9 and FIG. 10 will be described. FIG. 11 shows a display screen of a communication terminal usable for the voice communication system in embodiment 2 according to the present invention. The display screen shown in FIG. 11 notifies the transmitting user information. The example of display shown in FIG. 11 is provided in the case where the phone number of the transmission terminal 140 was not notified to the receiving terminal 150 via the communication carrier 120, and the receiving user did not respond to the call. Also in the example shown in FIG. 11, the transmitting user and the receiving user each have an account of an SNS related to the communication server 110, and the receiving terminal 150 does not block the transmission terminal 140.

As shown in FIG. 11, the display 230 of the receiving terminal 150 shows a missed-call notice icon 521, a user name 522 of the transmission terminal 140, and a user icon 523 that specifies the user of the transmission terminal 140. It is preferable that these pieces of information are displayed together with contents of other conversations in a time-series manner by a message communication function provided by the SNS such as a talk room or the like. In the example shown in FIG. 11, only the user name is displayed as the transmitting user information. The present invention is not limited to this, and the phone number, the mail address, the user ID, the registered nickname, the URL in the SNS or the like of the transmitting user may be displayed.

As described above, with the voice communication system in embodiment 2, the phone number of the transmission terminal 140, even when not being notified to the receiving terminal 150 via the communication carrier 120, is notified to the receiving terminal 150. In addition, it is determined that both of the transmitting user and the receiving user have an account of an SNS related to the communication server 110, and the arrival of an incoming call is notified by a message communication function provided by the SNS. This allows a record of message communications and a record of incoming calls can be checked at the same time.

Embodiment 3

A voice communication system in embodiment 3 according to the present invention, and a communication server and a communication terminal also in embodiment 3 according to the present invention usable for the voice communication system will be described in detail with reference to the drawings.

<System Structure>

Figure 12:
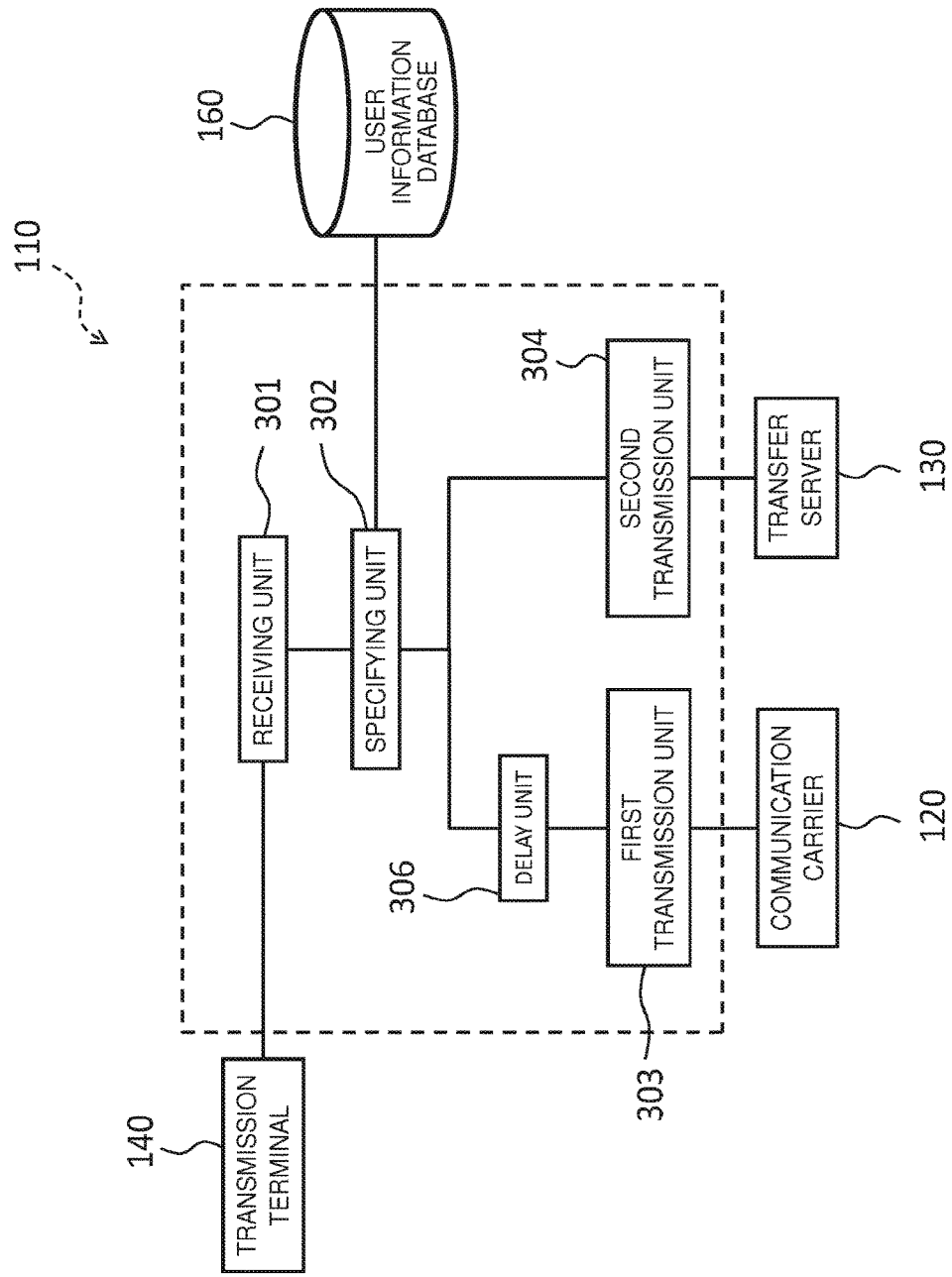
FIG. 12 is a block diagram showing a functional structure of a communication server in a voice communication system in embodiment 3 according to the present invention.

FIG. 12 is a block diagram showing a functional structure of a communication server 110 of a voice communication system in embodiment 3 according to the present invention. FIG. 12 is similar to FIG. 5, but the communication server 110 shown in FIG. 12 includes a delay unit 306 between the specifying unit 302 and the first transmission unit 303 unlike the communication server 110 shown in FIG. 5. A prescribed time duration after the information specifying the receiving terminal 150 and the transmitting user information specified by the specifying unit 302 are transmitted to the transfer server 130, the delay unit 306 transmits the address on the IP network assigned to the transmission terminal 140 by the specifying unit 302 and the request signal transmitted from the transmission terminal 140, to the communication carrier 120 via the first transmission unit 303. This allows the transmitting user information to be notified to the receiving terminal 150 before the receiving terminal 150 calls the receiving user upon receipt of the request signal.

<Operation Flow of the Voice Communication System>

Figure 13:
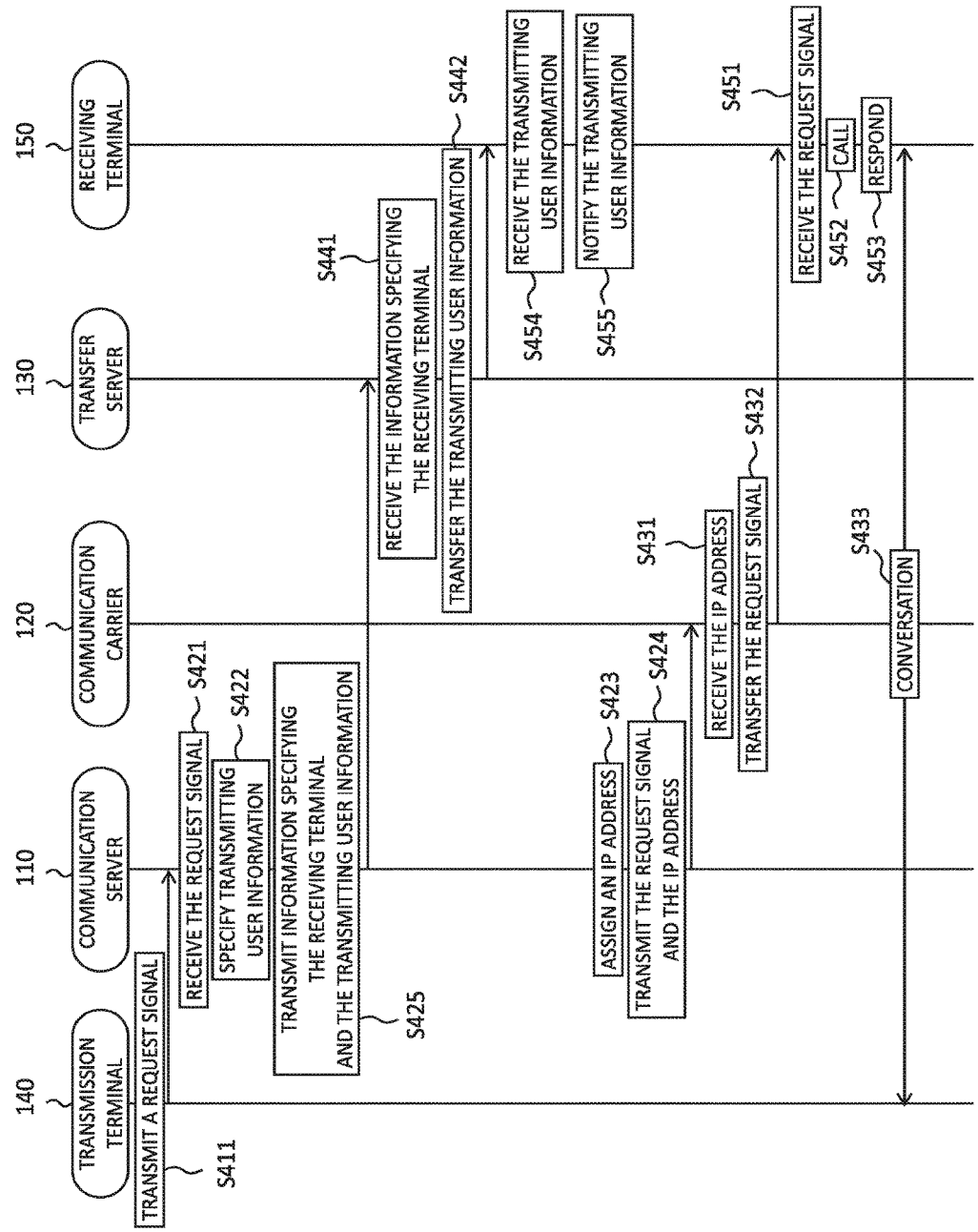
FIG. 13 shows an operation flow of the voice communication system in embodiment 3 according to the present invention.

The operation of the delay unit 306 shown in FIG. 12 will be described with reference to a flowchart of the voice communication system. FIG. 13 shows an operation flow of the voice communication system in embodiment 3 according to the present invention. FIG. 13 is similar to FIG. 6, but is different from FIG. 6 in the following point. In the operation flow shown in FIG. 13, the transmission of the transmitting user information in step S425 is performed before the transmission of the request signal and the IP address in step S424, and the notification of the transmitting user information in step S455 is performed before the call in step S452. Namely, the receiving user can obtain the transmitting user information on the transmission terminal 140 before being called by the receiving terminal 150. The IP address and the request signal are transmitted to the communication carrier 120 a prescribed time duration after the information specifying the receiving terminal 150 and the transmitting user information are transmitted to the transfer server 130.

In the operation flow shown in FIG. 13, it is not defined whether the notification of the transmitting user information to the receiving terminal 150 in step S455 is performed before or after the transmission of the request signal and the IP address in step S424. Alternatively, the operations in step S455 and step S424 may be associated with each other such that the operation in step S424 starts after the operation in step S455 is completed. The transmission of the transmitting user information in step S425 may be performed at any time between the receipt of the request signal in step S421 and the transmission of the request signal and the IP address in step S424. The transmission of the request signal and the IP address in step S424 may be performed at any time after the transmission of the transmitting user information in step S425 and the assignment of the IP address in step S423.

As shown in FIG. 13, the transmitting user information is notified to the receiving terminal 150 (step S455) before the receiving terminal 150 calls the receiving user (step S452). This allows the receiving terminal 150 to select, in advance, an action to be made in response to the request for a conversation from the transmission terminal 140. A specific example thereof will be described with reference to FIG. 14.

Figure 14:
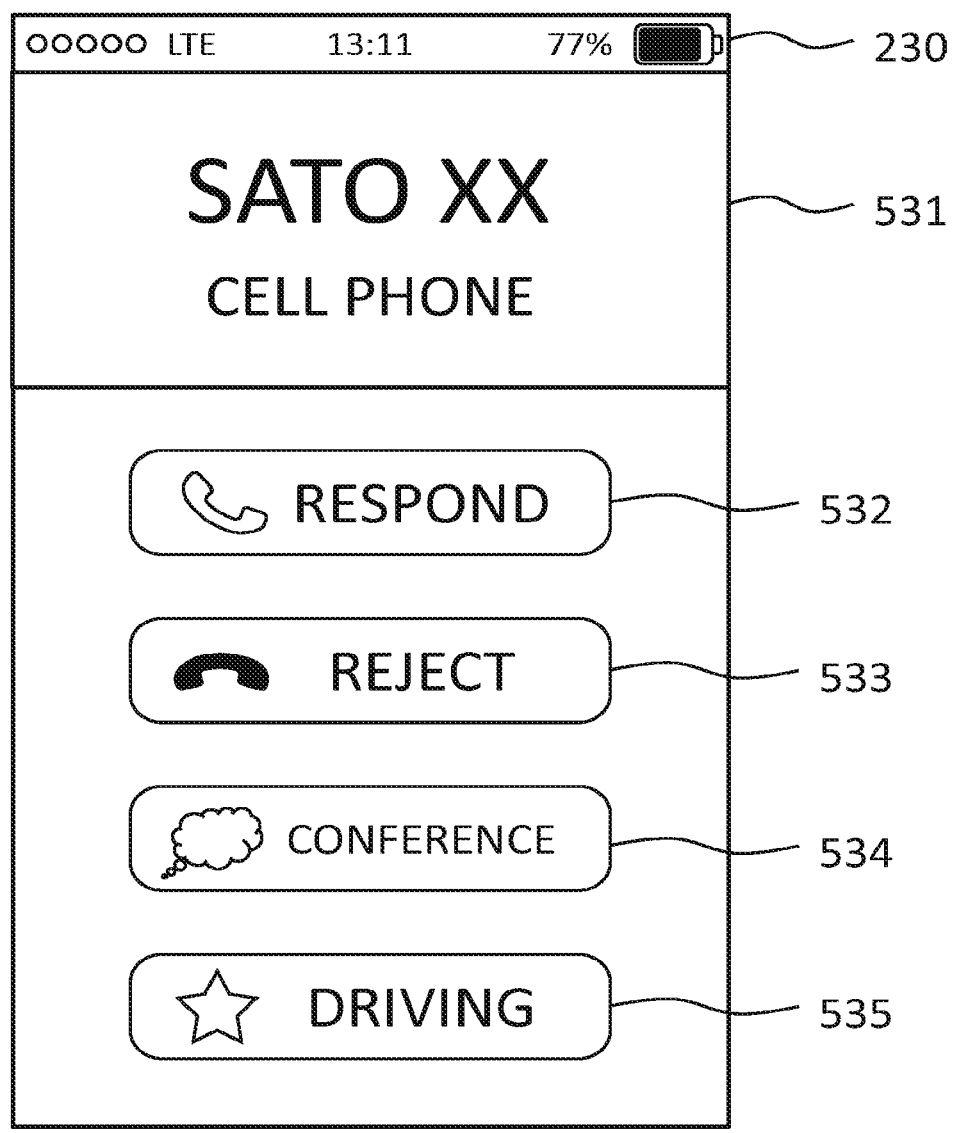
FIG. 14 shows an example of display screen of a communication terminal usable for the voice communication system in embodiment 3 according to the present invention, the display screen notifying user information.

FIG. 14 shows an example of display screen of a communication terminal usable for the voice communication system in embodiment 3 according to the present invention. The display screen shown in FIG. 14 notifies the user information. Referring to FIG. 13, when the transmitting user information is notified in step S455, an action selection screen as shown in FIG. 14 is displayed by the receiving terminal 150. The action selection screen shown in FIG. 14 is provided by an application program stored on the receiving terminal 150. In the example shown in FIG. 14, the action selection screen displays a transmitting user information display 531, a "select to respond to the incoming call" icon 532, a "select to reject the incoming call" icon 533, a "select to send the 'currently during a conference' message" icon 534, and a "select to send the 'currently driving' message icon 535.

Referring to FIG. 14, when the "select to respond to the incoming call" icon 532 is touched, the transmission terminal 140 and the receiving terminal 150 are communicably connected to each other via the communication carrier 120. When any other icon is touched, a fixed message in accordance with the content of the icon is notified to the transmission terminal 140. When the "select to reject the incoming call" icon 533 is touched, the receiving terminal 150 is caused to stop calling the receiving user, but the calling tone of the transmission terminal 140 may be continued.

As described above, with the voice communication system in embodiment 3, the transmitting user information is notified to the receiving terminal 150 before the receiving terminal 150 calls the receiving user. Therefore, the receiving user can obtain the transmitting user information before being called by the receiving terminal 150. In addition, the receiving user can make an action before being called by the receiving terminal 150.

The present invention is not limited to the above-described embodiments, and the above-described embodiments may be modified in various manners without departing from the gist of the present invention.

What is claimed is:

1. A communication server, comprising:
a memory storing computer readable instructions; and
at least one processor configured to execute the computer readable instructions to,
receive a call request including a phone number of a receiving terminal on a public switched telephone network (PSTN) via an IP network;
specify transmitting user information of a transmitting user using a transmission terminal transmitting the call request;
transmit an address of the transmission terminal on the IP network and the call request to a communication carrier having a gateway between the PSTN and the IP network; and
transmit the transmitting user information to the receiving terminal on short message service (SMS) via a transfer server or notify the transmitting user information to an application installed in the receiving terminal, wherein
the receiving terminal receives the transmitting user information in a case where the receiving terminal did not respond to a call based on the call request, and
the transmitting user information includes at least one of a name of the transmitting user, a nickname of the transmitting user and a phone number of the transmission terminal.

2. The communication server according to claim 1, wherein the at least one processor is further configured to:
determine whether the transmitting user using the transmission terminal and a receiving user using the receiving terminal each have an account on a Social Network Service (SNS); and
in response to results of the determining indicating the transmitting user and the receiving user each having an account on the SNS, transmit the transmitting user information to the receiving terminal via the SNS.

3. The communication server according to claim 2, wherein the at least one processor is further configured to notify the transmission terminal that the transmitting user information was transmitted to the receiving terminal via the SNS.

4. The communication server according to claim 2, wherein in response to the results of the determining indicating the receiving user not having the account established on the SNS, the at least one processor is further configured to transmit the transmitting user information to the transfer server.

5. The communication server according to claim 2, wherein in response to the results of the determining indicating the transmitting user and the receiving user each having the accounts established on the SNS and that the receiving terminal rejects an incoming call or communication from the transmission terminal, the at least one processor is further configured to transmit the transmitting user information to the transfer server.

6. The communication server according to claim 1, wherein the transfer server is an SMS server.

7. The communication server according to claim 1, wherein the at least one processor is further configured to transmit the transmitting user information to the transfer server after a call is connected between the transmission terminal and the receiving terminal in accordance with the call request.

8. The communication server according to claim 1, wherein the at least one processor is further configured to:
assign the address of the transmission terminal; and
transmit the address and the call request to the communication carrier during a desired time period after the transmitting user information is transmitted to the transfer server; and
transmit the transmitting user information to the receiving terminal before a call is connected between the transmission terminal and the receiving terminal in accordance with the call request.

9. The communication server according to claim 1, wherein the at least one processor is further configured to:
transmit the call request to the communication carrier before transmitting the transmitting user information to the transfer server.

10. The communication server according to claim 1, wherein a communication path of the address of the transmission terminal and the call request is different from a communication path of the transmitting user information.

11. A communication method, comprising:
receiving, using at least one processor, a call request including a phone number of a receiving terminal on a public switched telephone network (PSTN) via an IP network;
specifying, using the at least one processor, transmitting user information of a transmitting user using a transmission terminal transmitting the call request;
transmitting, using the at least one processor, an address of the transmission terminal on the IP network and the call request to a communication carrier having a gateway between the PSTN and the IP network; and
transmitting, using the at least one processor, the transmitting user information to the receiving terminal on short message service (SMS) via a transfer server or notify the transmitting user information to an application installed in the receiving terminal, wherein
the receiving terminal receives the transmitting user information in a case where the receiving terminal did not respond to a call based on the call request, and
the transmitting user information includes at least one of a name of the transmitting user, a nickname of the transmitting user and a phone number of the transmission terminal.

12. The communication method according to claim 11, further comprising:
determining, using the at least one processor, whether the transmitting user using the transmission terminal and a receiving user using the receiving terminal each have an account on a Social Network Service (SNS); and
in response to results of the determining indicating the transmitting user and the receiving user each have an account on the SNS, transmitting, using the at least one processor, the transmitting user information to the receiving terminal via the SNS.

13. The communication method according to claim 12, further comprising:
notifying, using the at least one processor, the transmission terminal that the transmitting user information was transmitted to the receiving terminal via the SNS.

14. The communication method according to claim 12, further comprising:
in response to the results of the determining indicating the receiving user does not have an account on the SNS, transmitting, using the at least one processor, the transmitting user information to the transfer server.

15. The communication method according to claim 12, further comprising:
in response to the results of the determining indicating the transmitting user and the receiving user each have an account on the SNS and that the receiving terminal rejects an incoming call or communication from the transmission terminal, transmitting, using the at least one processor, the transmitting user information to the transfer server.

16. The communication method according to claim 11, wherein the transfer server is an SMS server.

17. The communication method according to claim 11, wherein the transmitting user information is transmitted to the transfer server after a call is connected between the transmission terminal and the receiving terminal in accordance with the call request.

18. The communication method according to claim 11, further comprising:
assigning, using the at least one processor, the address of the transmission terminal;
transmitting, using the at least one processor, the address and the call request to the communication carrier during a desired time period after the transmitting user information is transmitted to the transfer server; and
transmitting, using the at least one processor, the transmitting user information to the receiving terminal before a call is connected between the transmission terminal and the receiving terminal in accordance with the call request.

19. The communication method according to claim 11, further comprising:
transmitting, using the at least one processor, the call request to the communication carrier before the transmitting user information is transmitted to the transfer server.

20. The communication method according to claim 11, wherein a communication path of the address of the transmission terminal and the call request is different from a communication path of the transmitting user information.

* * * * *